(12) United States Patent
Vontell, Sr. et al.

(10) Patent No.: US 10,094,220 B2
(45) Date of Patent: Oct. 9, 2018

(54) TURBINE ENGINE REPAIR METHODS

(71) Applicant: United Technologies Corporation, Hartford, CT (US)

(72) Inventors: John H. Vontell, Sr., Manchester, CT (US); Charles R. Watson, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 443 days.

(21) Appl. No.: 14/773,441

(22) PCT Filed: Dec. 2, 2013

(86) PCT No.: PCT/US2013/072537
§ 371 (c)(1),
(2) Date: Sep. 8, 2015

(87) PCT Pub. No.: WO2014/143224
PCT Pub. Date: Sep. 18, 2014

(65) Prior Publication Data
US 2016/0017712 A1    Jan. 21, 2016

Related U.S. Application Data

(60) Provisional application No. 61/794,571, filed on Mar. 15, 2013.

(51) Int. Cl.
*B29C 73/10* (2006.01)
*F01D 5/00* (2006.01)
(Continued)

(52) U.S. Cl.
CPC .............. *F01D 5/005* (2013.01); *B29C 73/10* (2013.01); *B32B 7/06* (2013.01); *B32B 27/283* (2013.01); *C09J 183/06* (2013.01); *F01D 5/288* (2013.01); *B29K 2083/00* (2013.01); *B29K 2105/0097* (2013.01); *B29L 2031/08* (2013.01); *B29L 2031/7504* (2013.01);
(Continued)

(58) Field of Classification Search
CPC ............ B29C 73/10; F01D 5/28; F01D 5/288
See application file for complete search history.

(56) References Cited

U.S. PATENT DOCUMENTS 7,938,923 B2    5/2011    Hood
7,981,229 B2    7/2011    Hood et al.
(Continued)

FOREIGN PATENT DOCUMENTS

EP    1881154 A1    1/2008
EP    2474410 A1    7/2012

OTHER PUBLICATIONS

Production Information Sheet: Arlon Product No. 99020NO15, Oct. 22, 2008, Arlon Silicone Technologies Division, Bear, Delaware.
(Continued)

*Primary Examiner* — Jeffry H Aftergut
*Assistant Examiner* — Jaeyun Lee
(74) *Attorney, Agent, or Firm* — Bachman & LaPointe, P.C.

(57) ABSTRACT

A method for patching a damaged polymeric erosion coating (250) on a gas turbine engine component. The method comprises removing a portion of the coating around a damage site (200; 202; 204) and applying a pre-formed coating patch (220).

13 Claims, 4 Drawing Sheets

(51) Int. Cl.
  *B32B 7/06* (2006.01)
  *B32B 27/28* (2006.01)
  *C09J 183/06* (2006.01)
  *F01D 5/28* (2006.01)
  *B29K 83/00* (2006.01)
  *B29K 105/00* (2006.01)
  *B29L 31/08* (2006.01)
  *B29L 31/00* (2006.01)

(52) U.S. Cl.
  CPC ..... *B32B 2307/748* (2013.01); *B32B 2556/00* (2013.01); *F05D 2220/32* (2013.01); *F05D 2220/36* (2013.01); *F05D 2230/10* (2013.01); *F05D 2230/23* (2013.01); *F05D 2230/80* (2013.01); *F05D 2300/222* (2013.01); *F05D 2300/40* (2013.01); *F05D 2300/437* (2013.01); *F05D 2300/601* (2013.01); *F05D 2300/603* (2013.01)

(56) References Cited

U.S. PATENT DOCUMENTS

| | | | |
|---|---|---|---|
| 2008/0159870 A1* | 7/2008 | Hong | B23P 6/007 416/224 |
| 2008/0229567 A1 | 9/2008 | Bublatch et al. | |
| 2009/0178842 A1* | 7/2009 | Liu | H05K 9/0052 174/389 |
| 2010/0062151 A1 | 3/2010 | Tuppen et al. | |
| 2010/0062180 A1 | 3/2010 | Tuppen et al. | |
| 2010/0247740 A1 | 9/2010 | Reitz et al. | |
| 2011/0059321 A1 | 3/2011 | Skoog et al. | |

OTHER PUBLICATIONS

International Search Report and Written Opinion for PCT/US2013/072537, dated Mar. 18, 2014.

* cited by examiner

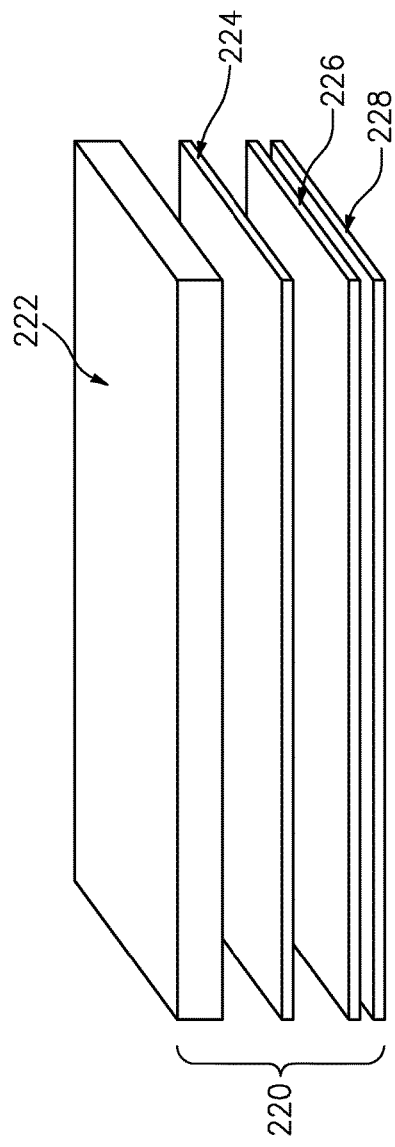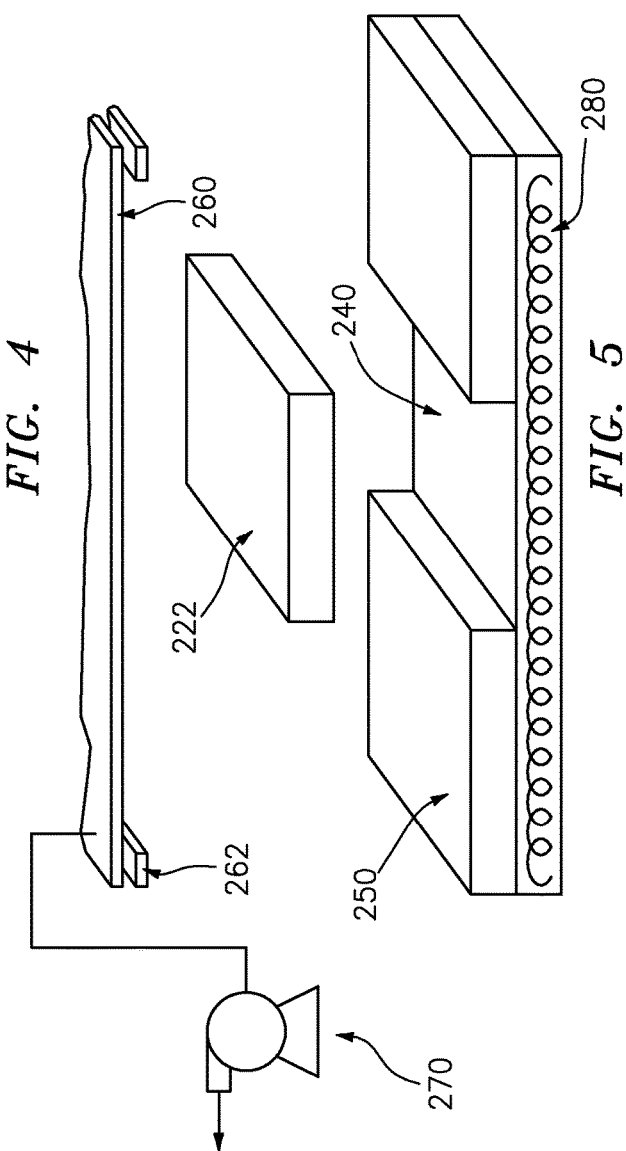

TURBINE ENGINE REPAIR METHODS

CROSS-REFERENCE TO RELATED APPLICATION

Benefit is claimed of U.S. Patent Application Ser. No. 61/794,571, filed Mar. 15, 2013, and entitled "Turbine Engine Repair Methods", the disclosure of which is incorporated by reference herein in its entirety as if set forth at length.

BACKGROUND

The disclosure relates to turbofan engines. More particularly, the disclosure relates to erosion coatings.

FIG. 1 shows a gas turbine engine 20 having an engine case 22 surrounding a centerline or central longitudinal axis 500. An exemplary gas turbine engine is a turbofan engine having a fan section 24 including a fan 26 within a fan case 28 held spaced apart from the engine case by a circumferential array of fan struts 29. The exemplary engine includes an inlet 30 at an upstream end of the fan case receiving an inlet flow along an inlet flowpath 520. The fan 26 has one or more stages 32 of fan blades. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The exemplary engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the exemplary engine, the blade stages of the LPC and LPT are part of a low pressure spool mounted for rotation about the axis 500. The exemplary low pressure spool includes a shaft (low pressure shaft) 50 which couples the blade stages of the LPT to those of the LPC and allows the LPT to drive rotation of the LPC. In the exemplary engine, the shaft 50 also drives the fan. In the exemplary implementation, the fan is driven via a transmission (not shown, e.g., a fan gear drive system such as an epicyclic transmission) to allow the fan to rotate at a lower speed than the low pressure shaft.

The exemplary engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

FIG. 2 shows an assembly of a fan exit case (including the exit guide vanes 29 and a circumscribing hoop structure 100) and a compressor intermediate case 102 (wherein a circumferential array of struts 104 structurally join an inner wall 106 of the core flowpath to an outer wall 108). The outer wall bears radial struts 110 that mate with inboard flanges 112 of the fan exit guide vanes 29 proximate the core nacelle (not shown) which defines the inboard boundary of the bypass flowpath.

The vanes 29 and the inboard surface of the fan case (e.g., along the hoop structure 100) bear an erosion coating. Similarly, a military style turbofan engine 200 (FIG. 3) may have an inlet case 202 and inlet vanes 204 (e.g., variable vanes) ahead of the fan 206 and which may bear an erosion coating. Exemplary erosion coatings are silicone. These coatings are subject to damage.

SUMMARY

One aspect of the disclosure involves a method for patching a damaged polymeric erosion coating on a gas turbine engine component. The method comprises removing a portion of the coating around a damage site and applying a pre-formed coating patch.

In one or more embodiments of any of the foregoing embodiments, the method further comprises priming the component.

In one or more embodiments of any of the foregoing embodiments, the priming is with a silane primer.

In one or more embodiments of any of the foregoing embodiments, the method further comprises applying a vacuum to the patch.

In one or more embodiments of any of the foregoing embodiments, the vacuum is applied via a vacuum blanket.

In one or more embodiments of any of the foregoing embodiments, the method further comprises heating the patch while the vacuum is applied.

In one or more embodiments of any of the foregoing embodiments, the heating is an internal heating via an anti-icing system.

In one or more embodiments of any of the foregoing embodiments, the method is performed in situ with the engine on an aircraft.

In one or more embodiments of any of the foregoing embodiments, the patch comprises: a molded cured silicone body; a silane primer on an underside of the body; a silicone adhesive on the primer; and a release strip on the adhesive, the method comprising removing the release strip before applying the patch.

In one or more embodiments of any of the foregoing embodiments, the damage site is along a fan inlet strut or fan exit strut.

In one or more embodiments of any of the foregoing embodiments, the damage site has a polymer matrix composite substrate.

Another aspect of the disclosure involves a patch comprising: a molded cured silicone body; a silane primer on an underside of the body; a silicone adhesive on the primer; and a release strip on the adhesive.

In one or more embodiments of any of the foregoing embodiments, the adhesive is a peroxide-cured silicone.

Another aspect of the disclosure involves a method for manufacturing the patch, the method comprising: molding and curing the body; preparing the underside by mechanical abrasion or plasma treating; applying the primer to the underside after the preparing; and applying the adhesive to the primer.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4 is an exploded view of a patch.

FIG. 5 is a cutaway exploded view of a damage site being patched.

Like reference numbers and designations in the various drawings indicate like elements.

DETAILED DESCRIPTION

Figure 1:
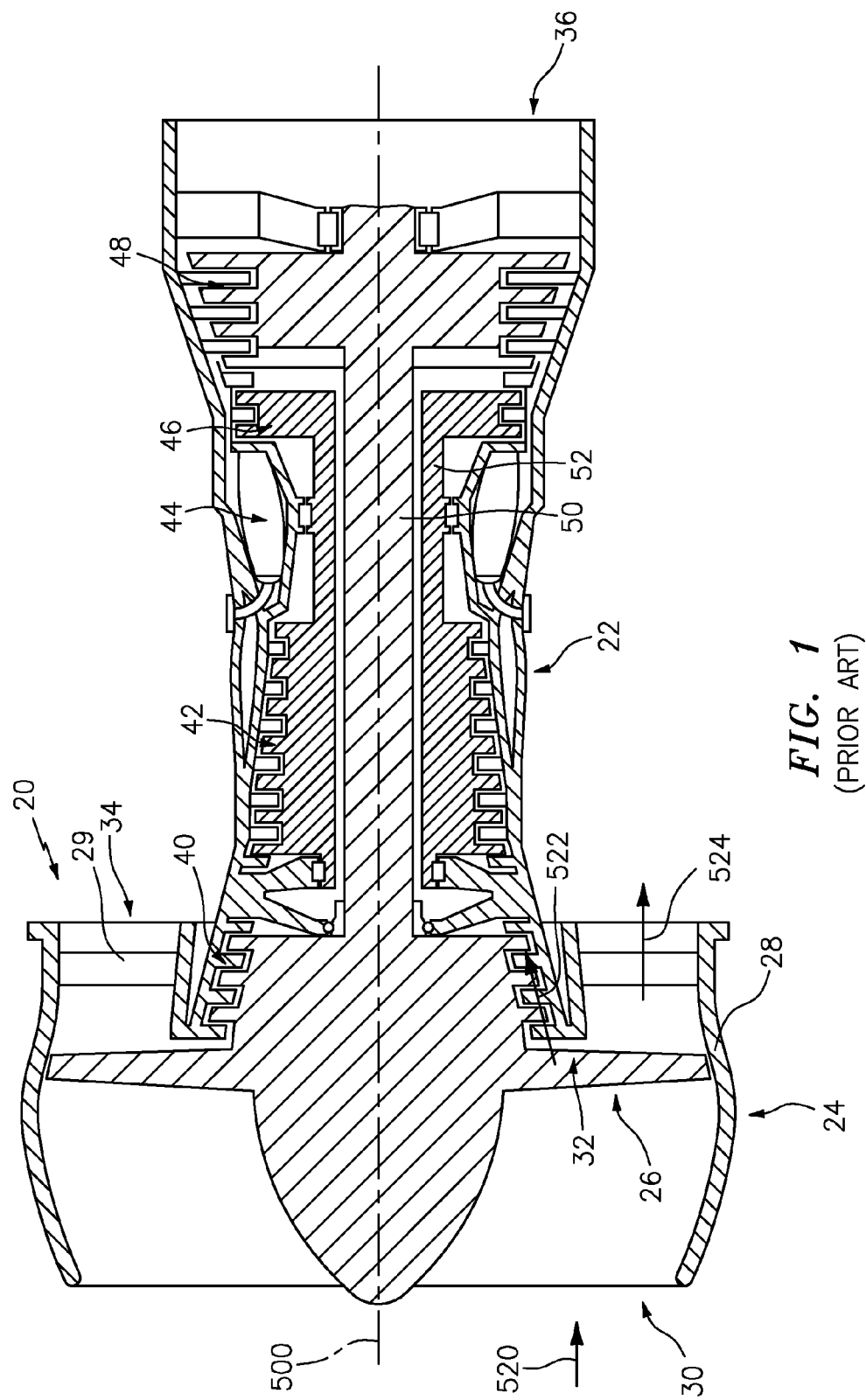
FIG. 1 is a partially schematic longitudinal sectional view of a gas turbine engine.
Figure 6:
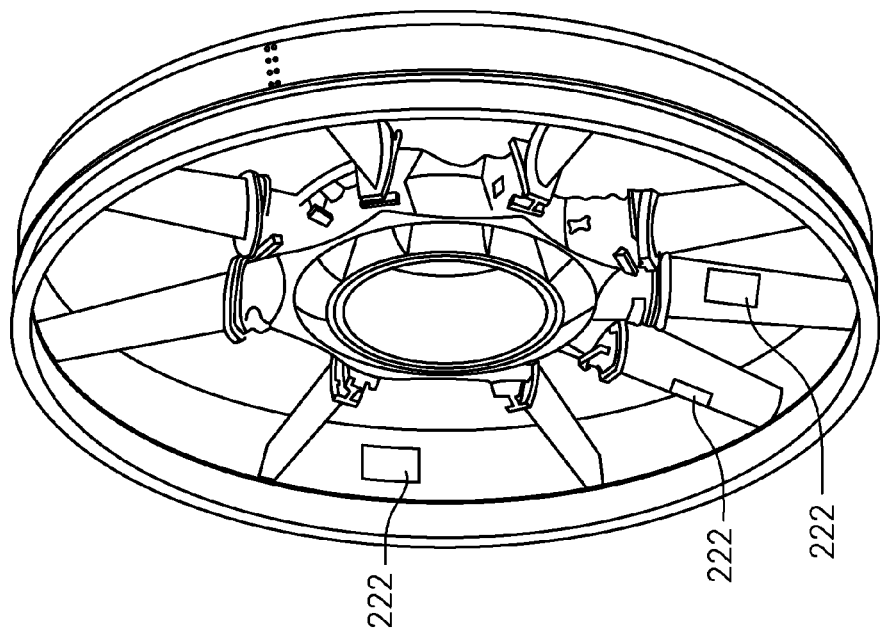
FIG. 6 is a view of the assembly of FIG. 2 after patching.
Figure 2:
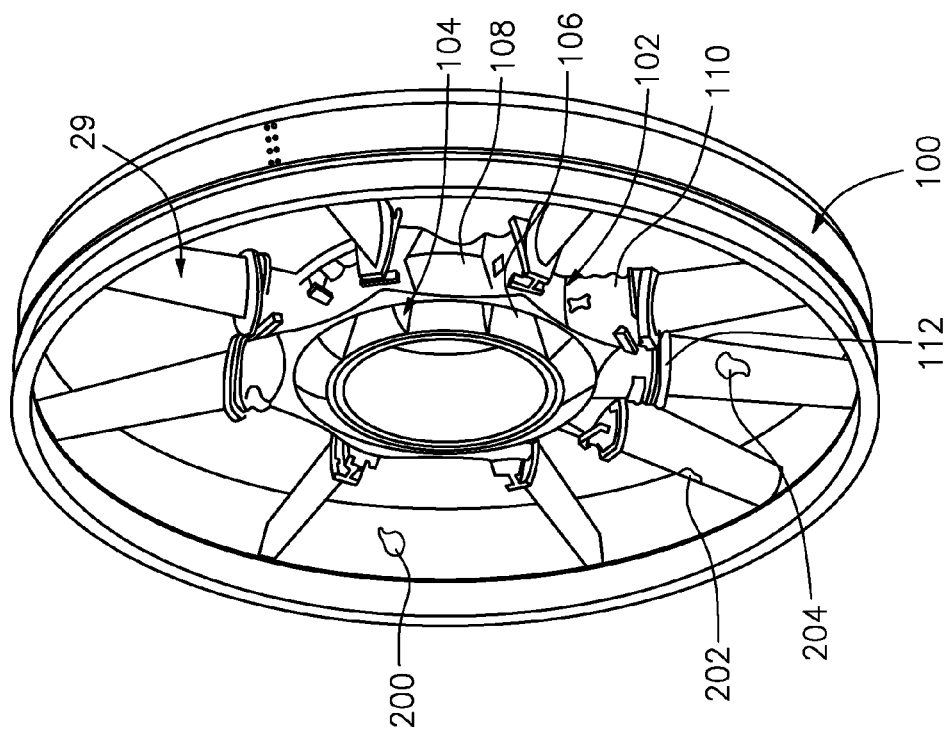
FIG. 2 is a view of a fan exit guide vane and compressor intermediate case assembly.
Figure 3:
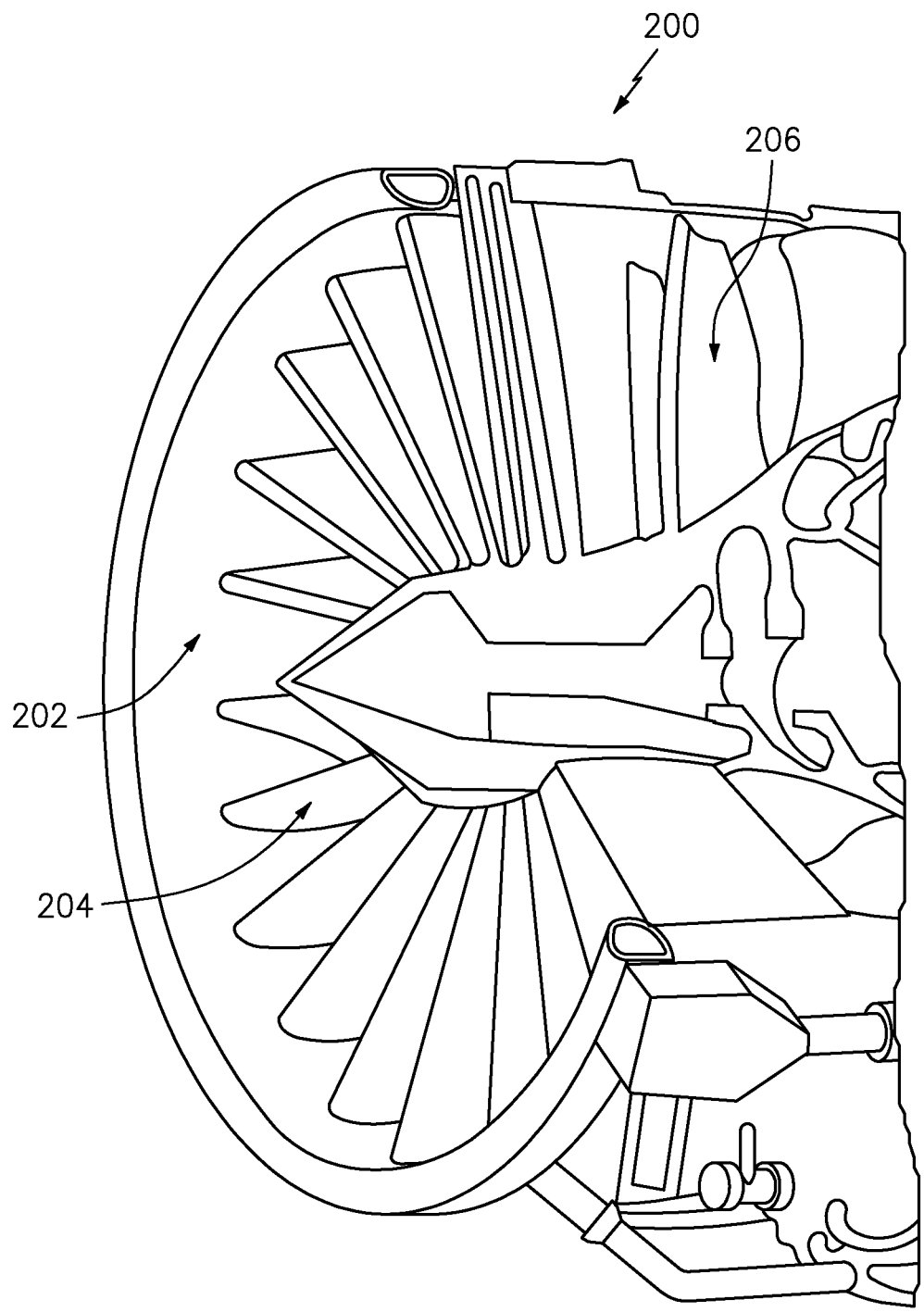
FIG. 3 is a partial cutaway view of an alternative engine.

FIG. 2 shows exemplary damage sites 200 (hoop inboard surface), 202 (vane leading edge), and 204 (vane pressure or suction side).

In an exemplary on-aircraft (or off-aircraft) repair, a region around the damage site is prepared by cutting away (e.g., with a blade and optionally using a patch template). The exposed component substrate (e.g., a non-metallic composite or a metallic composite or alloy) may be abraded. One abrasion option is hand abrasion such as by a metallic or non-metallic abrasive pad, sandpaper, or sanding cloth. A second option is an abrasive blasting method such as using a pencil blaster. A third option is the use of a plasma pen.

At least after abrasion and immediately prior to patching, there may be a cleaning. Cleaning functions to remove oil and the like, in addition to any particulate leftover from the abrasion. The exemplary cleaning is done using solvent or alkaline cleaner.

FIG. 4 shows a patch 220. The patch has a polymeric substrate or patch material 222. Exemplary patch material is a silicone. Alternative patch materials include urethane, fluoropolymer elastomer, or other erosion resistant elastomer. The material may be molded in flat sheets or in dedicated shapes for specific patches (e.g., an arcuate shape for leading edge repair).

A primer 224 may be applied to the underside of the substrate. Exemplary primers are silanes or other material compatible with the substrate. Exemplary application is plasma application, although hand application is an alternative. After primer application, an adhesive 226 is applied to the primed (e.g., by a hand-applied silane which may then be allowed to cure) underside. The exemplary adhesive is a spray or solvent applied silicone (e.g., a peroxide-cured silicone). A release medium (e.g., film or paper) 228 may be applied to cover the adhesive during shipping and storage. Alternatives involve not applying the adhesive until ready to repair. In such a case, a silicone paste or other adhesive may be applied just prior to bonding. The patch material may be pre-cut in stock generic shapes (e.g., rounds, squares, rectangles, and the like of various sizes). The patch may also be cut into part geometry-specific shapes to accommodate specific areas. The sheeting, however, may be in larger bulk form or only custom cut out on site prior to repair. Two exemplary silicones are R2180-2 or R2180-1 manufactured by NuSil Technology LLC. An exemplary adhesive is Arlon 99020N015 of Arlon LLC, a division of Handy & Harman Ltd. This is sold already formed on the release medium and may be applied to the primed substrate by cutting to shape, removing the release medium, and transferring (e.g., by hand).

With the damaged area removed and exposed substrate 240 (FIG. 5) cleaned, the exposed substrate of the damaged area may optionally be primed (e.g., via a hand-applied silane). If need be, the patch may be cut to size and shape. The release film (if present) is peeled off and the patch is applied. If adhesive was not pre-applied to the patch, adhesive may be applied prior to patch application, as noted above. To facilitate cure of the adhesive, the patched site may be subject to vacuum and elevated temperature. A vacuum blanket 260 may be applied around the damage site and may be adhered 262 (e.g., to adjacent coated 250 areas (FIG. 5)) or otherwise secured (e.g., via strapping) or may rely on vacuum to secure. Vacuum is applied (e.g., via a pump 270). The heating may be external or internal. Exemplary hoop and vane structures include internal electric de-icing systems 280 which may be engaged to provide heat.

After curing, the bag may be removed and the heat source disengaged. There may be optional trimming or other surface finishing.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic blade configuration, details of such configuration or its associated engine may influence details of particular implementations. Accordingly, other embodiments are within the scope of the following claims.

What is claimed is:

1. A method for patching a damaged polymeric erosion coating (250) on a gas turbine engine component, the method comprising:
   removing a portion of the coating around a damage site (200; 202; 204); and
   applying a pre-formed coating patch (220); wherein the patch comprises: a molded cured silicone body; a silane primer on an underside of the body; a silicone adhesive on the primer; and a release strip on the adhesive, the method comprising removing the release strip before applying the patch.

2. The method of claim 1 further comprising:
   priming the component.

3. The method of claim 2 wherein:
   the priming is with a silane primer.

4. The method of claim 1 further comprising:
   applying a vacuum to the patch.

5. The method of claim 4 wherein:
   the vacuum is applied via a vacuum blanket (260).

6. The method of claim 4 further comprising:
   heating the patch while the vacuum is applied.

7. The method of claim 6 wherein:
   the heating is an internal heating via an anti-icing system (280).

8. The method of claim 1 wherein:
   the method is performed in situ with the engine on an aircraft.

9. The method of claim 1 wherein:
   the damage site is along a fan inlet strut (206) or fan exit strut (29).

10. The method of claim 1 wherein:
    the damage site has a polymer matrix composite substrate (240).

11. A patch (220) comprising:
a molded cured silicone body (227);
a silane primer (224) on an underside of the body;
a silicone adhesive on the primer (226); and
a release strip on the adhesive (228).

12. The patch of claim 11 wherein:
the adhesive is a peroxide-cured silicone.

13. A method for manufacturing a patch comprising a silicone body; a silane primer on an underside of the body; a silicone adhesive on the primer; and a release strip on the adhesive, the method comprising:
    molding and curing the body;
    preparing the underside by mechanical abrasion or plasma treating;
    applying the primer to the underside after the preparing; and
    applying the adhesive to the primer.

\* \* \* \* \*